(12) United States Patent
Ellis et al.

(10) Patent No.: US 7,937,762 B2
(45) Date of Patent: May 3, 2011

(54) TRACKING AND IDENTIFYING OPERATIONS FROM UN-TRUSTED CLIENTS

(75) Inventors: John Leo Ellis, Sammamish, WA (US); Ashutosh Badwe, Redmond, WA (US); Juanya Davon Williams, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1045 days.

(21) Appl. No.: 11/623,252

(22) Filed: Jan. 15, 2007

(65) Prior Publication Data

US 2008/0172726 A1    Jul. 17, 2008

(51) Int. Cl.
*G06F 12/14* (2006.01)
*G06F 12/16* (2006.01)
*H04L 9/00* (2006.01)

(52) U.S. Cl. ............... 726/23; 726/6; 726/29; 380/277
(58) Field of Classification Search ............. 726/22–23, 726/26–30, 6; 380/277
See application file for complete search history.

(56) References Cited

U.S. PATENT DOCUMENTS

| | | | |
|---|---|---|---|
| 5,604,490 A * | 2/1997 | Blakley et al. ................ 726/5 |
| 5,784,463 A | 7/1998 | Chen et al. | |
| 5,956,505 A | 9/1999 | Manduley | |
| 6,047,268 A * | 4/2000 | Bartoli et al. ................ 705/35 |
| 6,260,141 B1 | 7/2001 | Park | |
| 6,701,438 B1 * | 3/2004 | Prabandham et al. ........ 726/11 |
| 6,829,704 B2 | 12/2004 | Zhang et al. | |
| 7,024,696 B1 | 4/2006 | Bahar | |
| 7,162,538 B1 | 1/2007 | Cordova | |
| 7,331,063 B2 | 2/2008 | Gunyakti et al. | |
| 7,565,323 B2 | 7/2009 | Hughes et al. | |
| 2002/0152405 A1 | 10/2002 | Colvin | |
| 2002/0178375 A1 * | 11/2002 | Whittaker et al. ............ 713/200 |
| 2003/0149900 A1 * | 8/2003 | Glassman et al. ............ 713/202 |
| 2004/0117640 A1 * | 6/2004 | Chu et al. .................... 713/188 |
| 2005/0005286 A1 | 1/2005 | Koskela et al. | |
| 2005/0033994 A1 | 2/2005 | Suzuki | |
| 2005/0090731 A1 | 4/2005 | Minogue et al. | |
| 2008/0005026 A1 | 1/2008 | Cross et al. | |
| 2008/0282360 A1 | 11/2008 | Bahar | |
| 2009/0031430 A1 | 1/2009 | Ward et al. | |
| 2010/0017886 A1 | 1/2010 | Desmicht et al. | |

* cited by examiner

*Primary Examiner* — Kambiz Zand
*Assistant Examiner* — Michael Guirguis
(74) *Attorney, Agent, or Firm* — Senniger Powers LLP

(57) ABSTRACT

Tracking data operations associated with unauthenticated computing devices to enable subsequent identification and remediation thereof. In embodiments in which one computing device has to trust another computing device without authenticating the other computing device, a machine identifier and a credential group value are associated with data operations in communications from the unauthenticated computing device. The data operations may be subsequently identified based on the machine identifier and credential group value. Remedial action may be taken on the identified data operations to restore data integrity.

17 Claims, 2 Drawing Sheets

TRACKING AND IDENTIFYING OPERATIONS FROM UN-TRUSTED CLIENTS

BACKGROUND

In typical client-server communications, a server accepts communications from a client only if that client has successfully authenticated itself to the server (e.g., by presenting valid credentials). When the server has to communicate with an un-trusted client without first authenticating the client, typical systems fail to provide mechanisms for preventing third parties from impersonating the client.

For example, in typical systems, the server receives an identifier associated with the un-trusted client and issues credentials to the un-trusted client. But the server has no mechanism for determining whether the un-trusted client is a legitimate client. A malicious third party, for example, may impersonate, spoof, or otherwise pretend to be the legitimate client by presenting an identifier and receiving issued credentials in return. Such a malicious third party may store corrupted data on the server, or cause other harm.

Further, in typical systems, the server has no mechanism for recognizing that the un-trusted client is a malicious third party, and for reversing any damage caused by the malicious third party.

SUMMARY

Embodiments of the invention include enable identification of data operations performed by an unauthenticated computing device. In an embodiment, a first computing device receives communications from a second computing device. The communications include credentials associated with the second computing device and data operations to be performed by the first computing device. The first computing device associates a machine identifier for the second computing device and a credential group value with the data operations. The first computing device modifies the credential group value when new credentials are assigned to the second computing device. The data operations may be subsequently identified based on the machine identifier and the credential group value.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
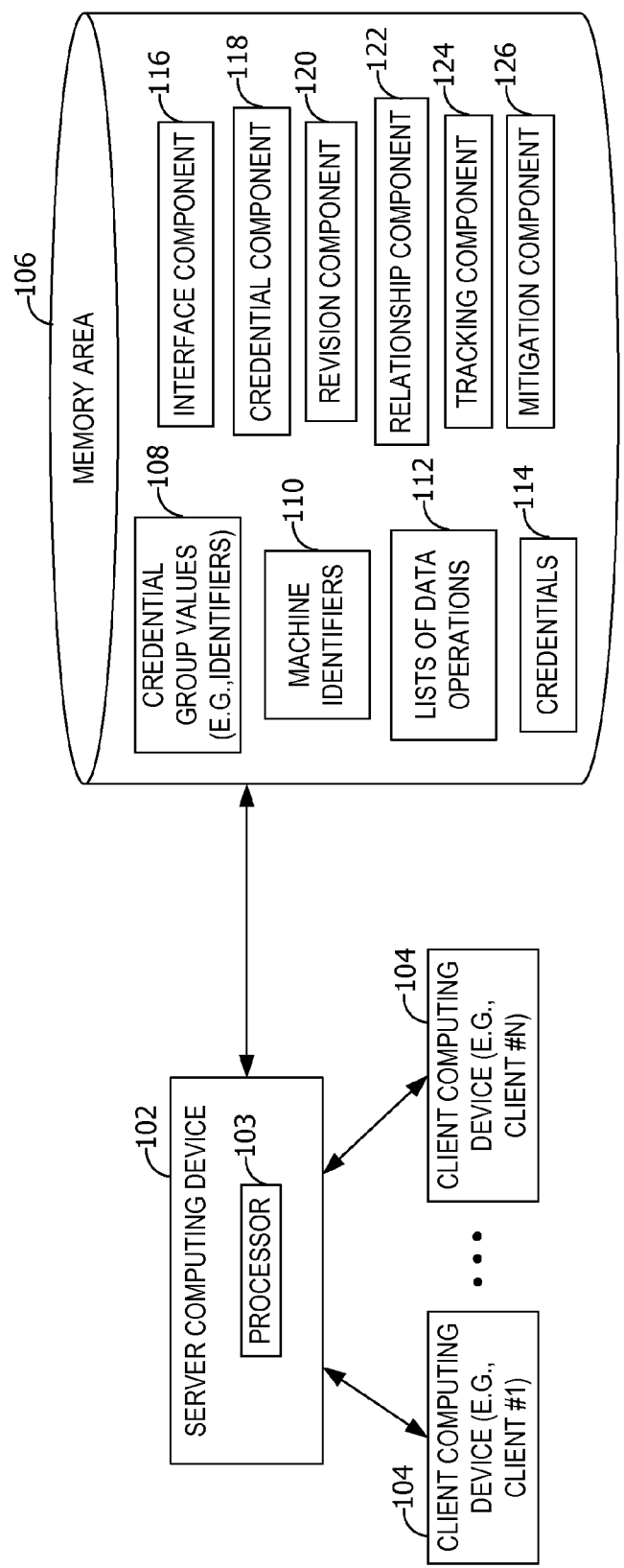
FIG. 1 is a block diagram illustrating an exemplary computing system environment in which aspects of the invention may operate.

In an embodiment, the invention tracks computing devices and associated data operations to enable subsequent identification of particular data operations. In particular, aspects of the invention such as shown in FIG. 1 enable the tracking of the computing devices such as client computing devices 104 and the associated data operations to enable mitigation, rollback, undoing, reversing, deleting, or the like of particular data operations to restore data integrity. Aspects of the invention are operable, for example, in embodiments such as FIG. 1 in which a first computing device (e.g., a server computing device 102) has to communicate with a second computing device (e.g., a client computing device 104) without first authenticating, authorizing, or otherwise confirming the identity and/or rights of the second computing device (e.g., prior to the server computing device 102 issuing credentials to the client computing device 104).

While embodiments of the invention are described and illustrated herein in terms of a server such as server computing device 102 communicating with one or more clients such as client computing device 104, aspects of the invention are operable in numerous other embodiments such as in peer-to-peer relationships between computing devices.

In an example, a server such as the server computing device 102 receives from a client such as the client computing device 104 a request for a credential such as a certificate, username/password, or the like. The server issues the credentials 114, and the client proceeds to send communications to the server to perform data operations or request that the data operations be performed. In this example, the server acts as a repository for data submitted and/or manipulated by one or more clients via the communications. Exemplary data includes asset management data (e.g., hardware and/or software inventory data for the clients), web site traffic data, etc. Aspects of the invention enable the tracking and identification of these data operations and associated data. For example, some communications from a client may later be determined to originate from a malicious third party (e.g., an impersonation attach by the third party), or the data operations in the communications may be determined to be faulty, inaccurate, or corrupted. In such an example, it is desirable to distinguish communications (and the data operations) from the malicious third party from communications from the legitimate client. In this manner, aspects of the invention enable remedial action such as reversing the data operations, deleting data associated with the data operations, or the like to restore data integrity.

In general, aspects of the invention track client communications and associated data operations through at least two identifiers. A first identifier is particular to each computing device. This first identifier comprises, for example, a machine identifier. A second identifier comprises, for example, a revision number, a credential group identifier or value, a certificate group identifier or value, or the like. The second identifier is modified whenever a request for new credentials 114 is received from a client by the server. For example, the second identifier may be incremented.

Referring again to FIG. 1, a block diagram illustrates an exemplary computing system environment in which aspects of the invention may be implemented. A computing device such as a server computing device 102 communicates with one or more computing devices such client computing devices 104 (e.g., client #1 through client #N). The server computing device 102 has access to one or more computer-readable media such as a memory area 106. The memory area 106 stores one or more credential group values 108, one or more machine identifiers 110, one or more lists of one or more data operations 112, and one or more credentials 114. One or more of the plurality of credential group values 108 are associated with one of the plurality of machine identifiers 110. Each of the plurality of lists of data operations 112 is associated with one of the plurality of credential group values 108 and one of the plurality of machine identifiers 110. The credential group values 108, machine identifiers 110, lists of one or more data operations 112, and credentials 114 persist across communication sessions between the server computing device 102 and the client computing device 104, and are thus distinguishable from session identifiers as known in the art. The associations among the credential group values 108, machine identifiers 110, lists of one or more data operations 112, and credentials 114 may be implemented, for example, in a table, database, or other data structure accessible to the server computing device 102.

The memory area 106 also stores computer-executable components such as an interface component 116, a credential component 118, a revision component 120, a relationship component 122, a tracking component 124, and a mitigation component 126. The interface component 116 receives a request for credentials 114 from an unauthenticated computing device. The request includes a machine identifier associated with the unauthenticated computing device. The unauthenticated computing device may request a new credential, certificate, token, or other security data for several reasons. The credential may not be available to the unauthenticated computing device, or the credential may be corrupted or expired. The credential storage location on the unauthenticated computing device (e.g., a credential store) may be unreliable, or the data therein corrupt or compromised. In yet another example, the unauthenticated computing device may have a newly installed operating system that lacks a credential.

The credential component 118 issues the credentials 114 for association with the machine identifier. The revision component 120 increments a credential group value associated with the machine identifier. The credential group value, credential group identifier, revision number, or the like is sent to the client for storage and use in subsequent communications with the server. For example, the credential group value may be encrypted in a certificate such that the credential group value is not capable of being easily discernible by the client or a potential attacker intercepting or accessing the certificate illegitimately. On the server, the valid credential group value is stored securely in an embodiment (e.g., in a secure store, in an encrypted form, or in a certificate).

In another embodiment, the credential group value is never sent to the client computing device 104, and the client computing device 104 never sends the credential group value to the server computing device 102. In such an embodiment, the credential group value is maintained solely and exclusively by the server computing device 102 (e.g., associated with the credential and the machine identifier associated with the client computing device 104. In such an embodiment, a malicious third party may obtain the credential, but will not be able to obtain the credential group value.

The relationship component 122 associates the credentials 114 issued by the credential component 118 with the credential group value incremented by the revision component 120. The tracking component 124 associates data operations from the unauthenticated computing device with the machine identifier and the incremented credential group value to enable identification of the unauthenticated computing device as the source of the data operations. In an embodiment, the tracking component 124 associates data operations from a plurality of computing devices. The mitigation component 126 identifies the data operations associated with the unauthenticated computing device based on the machine identifier and the credential group value. The mitigation component 126 operates, for example, to delete data associated with a particular credential group value if the set of operations associated with the particular credential group value are found to be invalid.

Remedial action may be taken on the identified data operations to restore data integrity (e.g., delete data, reverse data, reverse operations, undo operations, restore deleted data, and the like). In an embodiment, aspects of the invention are operable in a system in which data records are written to a database maintained by the server. When data is added to the database, a new data record including the data is added to the database. When data is deleted from the database, a new data record indicating the deletion is added to the database. In this manner, aspects of the invention implement mitigation of suspect data operations by searching for and removing the data records having the identified machine identifier and credential group value associated therewith. In other embodiments, a database logs execution of each data operation for subsequent identification and removal of particular data records. In such an embodiment, the log file is searched by the server for the appropriate data records.

In an embodiment, a processor associated with the server computing device 102 is configured to execute the components illustrated in FIG. 1, or is otherwise configured to execute computer-executable instructions for populating the memory area 106 with the plurality of credential group values 108, the plurality of machine identifiers 110, and the plurality of lists of data operations 112. The embodiments described and illustrated herein constitute means for populating the memory area 106 with the plurality of credential group values 108, the plurality of machine identifiers 110, and the plurality of lists of data operations 112; means for identifying one of the plurality of lists of data operations 112 based on the selected machine identifier and the corresponding one of the plurality of credential group values 108; and means for mitigating each of the data operations in the identified list of data operations 112.

In an embodiment, the issued credentials 114 are also stored in the memory area 106. The processor is further configured to execute computer-executable instructions for selecting a machine identifier and a corresponding one of the plurality of credential group values 108 and identifying one of the plurality of lists of data operations 112 based on the selected machine identifier and the corresponding one of the plurality of credential group values 108. For example, the server may receive notice from a client or other entity that communications (and data operations) associated with a particular machine identifier and particular credential group value 108 were received from a party other than the legitimate client associated with the particular machine identifier. Additional computer-executable instructions are directed to mitigating each of the data operations in the identified list of data operations 112.

The server computing device 102 typically has at least some form of computer readable media. Computer readable media, which include both volatile and nonvolatile media, removable and non-removable media, may be any available medium that may be accessed by the server computing device 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the server computing device 102. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer such as the server computing device 102 executes computer-executable instructions such as those illustrated in the figures to implement aspects of the invention.

Figure 2:
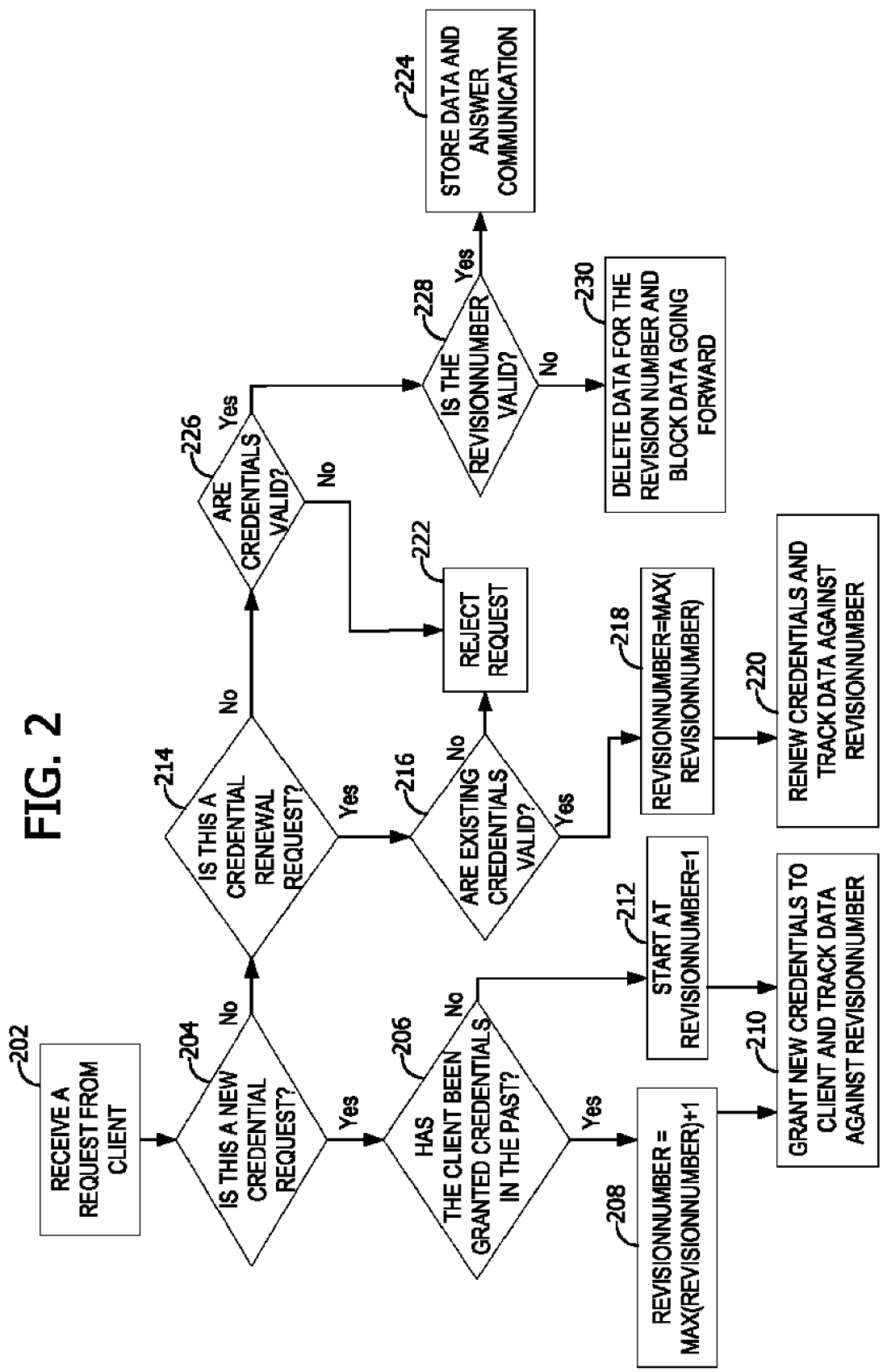
FIG. 2 is an exemplary flow chart illustrating operation of aspects of the invention for tracking communications from a computing device.

Referring next to FIG. 2, an exemplary flow chart illustrates operation of aspects of the invention for tracking communications from a computing device. At 202, a server, a first computing device, or other computing device, receives a request for credentials from an unauthenticated client, second computing device, or other computing device. The request includes, for example, a machine identifier associated with the unauthenticated client. If the request is for new credentials at 204 and the client has been granted credentials previously at 206, a revision number associated with the client is incremented at 208. New credentials are issued to the client and subsequent communications from the client are tracked using the incremented revision number at 210. For example, the server makes an association between the new credentials, a machine identifier associated with the client, and the incremented revision number. This association among the credentials, the machine identifier, and the revision number persists across communication sessions between the client and the server.

Tracking the communications and data operations comprises, in an embodiment, associating the machine identifier of the client and the revision number (or credential group identifier or value) with data operations associated with the communications from the client.

If the request is for new credentials but the client has not been granted credentials previously, a revision number, credential group identifier, credential group value, or the like is assigned to the client (e.g., the machine identifier of the client) at 212. If the request is a request for a renewal of existing credentials at 214 (rather than for new credentials) and the existing credentials are valid at 216, the revision number is held at its current value (e.g., the maximum of all revision numbers assigned to that client) at 218, the existing credentials are renewed at 220, and subsequent communications from the client are tracked using the revision number at 220. Renewal of the existing credentials involves, for example, issuing new credentials or simply extending the validity of the existing credentials. If the existing credentials are invalid at 216, the request is rejected at 222. For example, the request may be deleted, an error message may be sent to the computing device that sent the request, etc.

If the received request is neither a request for new credentials nor a request for renewal of existing credentials, the communication (and associated data and data operations) is stored and processed at 224 if the credentials are valid and 226 and the revision number is the current, valid revision number at 228. If the credentials are invalid at 226, the request is rejected at 222. If the credentials are valid at 226 but the revision number is invalid at 228, then the server concludes that the communication was received from an illegitimate client. At 230, the data associated with the request is deleted and subsequent communications bearing the invalid revision number are blocked (e.g., not processed, not stored, etc.).

Table 1 below illustrates exemplary operations for identifying undesirable or suspect data operations and restoring data integrity. In general, aspects of the invention operate to identify the suspect data operations based on a machine identifier (e.g., client identifier) associated with a computing device sending the communications with the suspect data operations and a credential group identifier (e.g., revision number) associated with the communications.

TABLE 1

| | | Exemplary Operations for Restoring Data Integrity. | | |
|---|---|---|---|---|
| Date | Event | Client ID and Revision Number Presented to the Server | Client ID and Revision Number After Event | Remarks |
| D1 | Client C1 that did not have any credentials asks for new credentials | ID: C1 RevisionNumber: N/A | ID: C1 RevisionNumber: R1 | Client has asked for credentials and server has granted them. All further communication and data stored on the server is tracked against C1R1 |

TABLE 1-continued

Exemplary Operations for Restoring Data Integrity.

| Date | Event | Client ID and Revision Number Presented to the Server | Client ID and Revision Number After Event | Remarks |
|---|---|---|---|---|
| D2 | Client C1 got re-imaged and needs new credentials | ID: C1 RevisionNumber: N/A | ID: C1 RevisionNumber: R2 | Server does not know if this is a request from an attacker or a real C1 who has lost credentials due to re-imaging etc. Request for credentials is granted. All further communication and data stored on the server is tracked against C1R2 |
| D3 | Server needs to identify all data received from C1 | N/A | N/A | All data received from C1 irrespective of RevisionNumber is retrieved and reported |
| D4 | Attacker pretending to be C1 asks for new credentials. | ID: C1 RevisionNumber: N/A | ID: C1 RevisionNumber: R3 | Server does not know if this is a request from an attacker or a real C1 who has lost credentials due to re-imaging etc. Request for credentials is granted. All further communication and data stored on the server is tracked against C1R3 |
| D5 | Client C1 got re-imaged and needs new credentials | ID: C1 RevisionNumber: N/A | ID: C1 RevisionNumber: R4 | Server does not know if this is a request from an attacker or a real C1 who has lost credentials due to re-imaging etc. Request for credentials is granted. All further communication and data stored on the server is tracked against C1R4 |
| D6 | Server needs to identify all data received from C1 | N/A | N/A | All data received from C1 irrespective of RevisionNumber is retrieved and reported. Bad data from R3 is also included. |
| D6 | Attacker has been identified as C1R3 | N/A | N/A | All data from Revision R3 is deleted. Data integrity is restored. Communication from C1R3 is blocked. |
| D7 | Server needs to identify all data received from C1 | N/A | N/A | All data received from C1 irrespective of RevisionNumber is retrieved and reported. Bad data from R3 is no longer present. |

The computing device sending the communications with the suspect data operations may be identified explicitly to the server (e.g., in a communication from a third party), or the server may deduce that security has been compromised. In an embodiment in which the computing devices communicate the credential group identifier to the server, the server may deduce that security has been compromised by receiving communications from two computing devices where each communication has valid credentials and the same machine identifier but different credential group identifiers (e.g., revision number). In such an example, the malicious computing device may have obtained a copy of the valid credentials for the legitimate computing device. Table 2 below illustrates an exemplary sequence of events in which the server detects that an attack is underway.

TABLE 2

Exemplary Operations for Detecting an Attack in an Embodiment in which the RevisionNumber is Communicated to the Server.

| Date | Event | Client ID and Revision Number presented to the server | Remarks |
|---|---|---|---|
| D1 | Client C1 communicates with server with existing credentials | ID: C1 RevisionNumber: R1 | Server tracks the communication and the data stored on the server is tracked against C1R1 |
| D2 | Attacker gets hold of C1's credentials and communicates | ID: C1 RevisionNumber: Rx | Server detects an attack and takes remedial |

TABLE 2-continued

Exemplary Operations for Detecting an Attack in an Embodiment in which the RevisionNumber is Communicated to the Server.

| Date | Event | Client ID and Revision Number presented to the server | Remarks |
|---|---|---|---|
| | with Server with a different RevisionNumber | | steps |

In an embodiment in which the credential group identifier is known only to the server, the server may deduce that security has been compromised by receiving a communication from a computing device where the communication includes valid credentials but a machine identifier that does not correspond to the credentials. In such an example, the malicious computing device may have obtained a copy of the valid credentials for the legitimate computing device. Table 3 below illustrates an exemplary sequence of events in which the server detects that such an attack is underway.

TABLE 3

Exemplary Operations for Detecting an Attack in an Embodiment in which the RevisionNumber is not Communicated to the Server.

| Date | Event | Client ID and Machine Identifier presented to the server | Remarks |
|---|---|---|---|
| D1 | Client C1 communicates with server with existing credentials | ID: C1 MachineIdentifier: M1 | Server tracks the communication and the data stored on the server is tracked against C1M1 |
| D2 | Attacker gets hold of C1's credentials and communicates with Server with a MachineIdentifier other than M1 | ID: C1 MachineIdentifier: Mx | Server detects an attack and takes remedial steps |

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an,""the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
receiving, by a first computing device, a request for credentials from an unauthenticated second computing device, said request including a machine identifier associated with the unauthenticated second computing device;
issuing the credentials for association with the machine identifier;
associating the issued credentials with the machine identifier;
assigning a credential group identifier to the machine identifier;
associating the issued credentials with the assigned credential group identifier; and
associating the machine identifier and the credential group identifier with data operations associated with the unauthenticated second computing device to enable identification of the unauthenticated computing device as the source of the data operations, wherein the association among the credentials, the machine identifier, and the credential group identifier persists across communication sessions between the first computing device and the unauthenticated second computing device, and wherein the first computing device modifies the credential group identifier responsive to the issuance of additional credentials for the unauthenticated second computing device;
wherein the unauthenticated second computing device is one of a plurality of computing devices communicating with the first computing device, and further comprising:
identifying a particular computing device from the plurality of computing devices and identifying a particular credential group identifier associated with the particular computing device;
identifying data operations associated with the particular computing device via a machine identifier associated with the particular computing device and via the particular credential group identifier; and
identifying the data operations associated with an unauthenticated computing device based on the machine identifier and the credential group identifier;
mitigating the identified data operations to restore data integrity by deleting data associated with a particular credential group identifier in response to the identified operations associated with the particular credential group identifier being invalid.

2. The method of claim 1, wherein the issued credentials have expired, and further comprising:
receiving a request for other credentials, said request comprising the machine identifier;
issuing the other credentials for association with the machine identifier;

associating the other credentials with the machine identifier;

associating the other credentials with the assigned credential group identifier without assigning another credential group identifier to the machine identifier.

3. The method of claim 1, wherein the issued credentials have not expired, and further comprising:

receiving a request for other credentials for association with the machine identifier;

issuing the other credentials for the unauthenticated computing device;

associating the other credentials with the machine identifier;

assigning another credential group identifier to the machine identifier;

associating the other credentials with the assigned other credential group identifier; and associating the machine identifier and the other credential group identifier with data operations associated with the unauthenticated second computing device to enable identification of the unauthenticated second computing device as the source of the data operations.

4. The method of claim 1, wherein the unauthenticated second computing device is one of a plurality of computing devices communicating with the first device, and further comprising identifying an impersonation attack from one of the plurality of computing devices by receiving communications from two of the plurality of computing devices, said received communications each having therein the same machine identifier, and said communications having therein at least two different credential group identifiers therein.

5. The method of claim 1, further comprising receiving the data operations from the unauthenticated computing device.

6. The method of claim 1, further comprising one or more computer-readable storage media having computer-executable instructions for performing said receiving, issuing, associating, and assigning.

7. A system comprising:

a memory area for storing a plurality of credential group values, a plurality of machine identifiers each associated with a computing device, and a plurality of lists of data operations, wherein one or more of the plurality of credential group values are associated with one of the plurality of machine identifiers, wherein each of the plurality of lists of data operations are associated with one of the plurality of credential group values and one of the plurality of machine identifiers; and a processor configured to execute computer-executable instructions for:

populating the memory area with the plurality of credential group values, the plurality of machine identifiers, and the plurality of lists of data operations;

selecting a machine identifier and a corresponding one of the plurality of credential group values;

identifying one of the plurality of lists of data operations based on the selected machine identifier and the corresponding one of the plurality of credential group values;

identifying the data operations associated with an unauthenticated computing device based on the selected machine identifier and the selected credential group identifier; and mitigating each of the data operations in the identified list of data operations to restore data integrity if the identified operations associated with the particular credential group value are found to be invalid.

8. The system of claim 7, wherein the processor is further configured to execute computer-executable instructions for receiving a request including the machine identifier and the corresponding one of the plurality of credential group values, said request indicating that a computing device associated with the machine identifier was unauthorized to perform the mitigated data operations.

9. The system of claim 7, further comprising means for populating the memory area with the plurality of credential group values, the plurality of machine identifiers, and the plurality of lists of data operations.

10. The system of claim 7, wherein the processor is further configured to execute computer-executable instructions for storing the credentials in the memory area.

11. The system of claim 7, wherein the processor is further configured to execute computer-executable instructions for creating a new credential group value by incrementing the corresponding one of the plurality of credential group values.

12. The system of claim 7, wherein the processor is further configured to execute computer-executable instructions for mitigating each of the data operations in the identified list of data operations by reversing each of the data operations in the identified list of data operations by searching for and removing a data record having the identified machine identifier and the credential group value associated therewith.

13. The system of claim 7, wherein the processor is further configured to execute computer-executable instructions for selecting the machine identifier and the corresponding one of the plurality of credential group values responsive to receiving a plurality of communications having the same machine identifier but different credential group values.

14. The system of claim 7, further comprising means for identifying one of the plurality of lists of data operations based on the selected machine identifier and the corresponding one of the plurality of credential group values.

15. The system of claim 7, further comprising means for mitigating each of the data operations in the identified list of data operations.

16. The system of claim 7, wherein the processor is further configured to execute computer-executable instructions for:

receiving a request from a computing device, said request specifying data operations to be performed, said communications comprising a particular machine identifier and a particular credential group value;

determining that the particular credential group value is invalid; and rejecting the request.

17. One or more computer-readable, tangible storage media having computer-executable components, wherein the storage media does not include a propagated signal, said components comprising:

an interface component for receiving a request for credentials from an unauthenticated computing device, said request including a machine identifier associated with the unauthenticated computing device;

a credential component for issuing the credentials for association with the machine identifier;

a revision component for incrementing a credential group value associated with the machine identifier;

a relationship component for associating the credentials issued by the credential component with the credential group value incremented by the revision component;

a tracking component for associating data operations from the unauthenticated computing device with the machine identifier and the incremented credential group value to enable identification of the unauthenticated computing device as the source of the data operations;

wherein the tracking component associates data operations from a plurality of computing devices; and further comprising a mitigation component for identifying the data operations associated with the unauthenticated computing device based on the machine identifier and the credential group value to delete data associated with a particular credential group value if the set of operations associated with the particular credential group value are found to be invalid.

* * * * *